United States Patent
Ellens et al.

(10) Patent No.: US 8,100,990 B2
(45) Date of Patent: Jan. 24, 2012

(54) METHODS FOR INTEGRATED FAST PYROLYSIS PROCESSING OF BIOMASS

(75) Inventors: Cody James Ellens, Ankeny, IA (US); Jared Nathaniel Brown, Ankeny, IA (US); Anthony Joseph Sherwood Pollard, Ames, IA (US); Dennis Stephan Banasiak, Urbandale, IA (US)

(73) Assignee: Avello Bioenery, Inc., Des Moines, IA (US)

(*) Notice: Subject to any disclaimer, the term of this patent is extended or adjusted under 35 U.S.C. 154(b) by 0 days.

(21) Appl. No.: 13/174,849

(22) Filed: Jul. 1, 2011

(65) Prior Publication Data

US 2011/0258914 A1 Oct. 27, 2011

Related U.S. Application Data

(60) Provisional application No. 61/486,304, filed on May 15, 2011, provisional application No. 61/491,188, filed on May 28, 2011.

(51) Int. Cl.
*C10L 5/40* (2006.01)
*C10L 5/00* (2006.01)

(52) U.S. Cl. ............... 44/589; 44/590; 44/599; 44/605; 44/606; 44/607; 201/4; 201/13; 201/25

(58) Field of Classification Search ............ 44/589, 44/590, 599, 605, 606, 607; 201/4, 13, 25
See application file for complete search history.

(56) References Cited

U.S. PATENT DOCUMENTS

| | | | | |
|---|---|---|---|---|
| 5,605,551 A * | 2/1997 | Scott et al. | ............ | 44/307 |
| 2004/0111968 A1* | 6/2004 | Day et al. | ............ | 48/197 FM |
| 2005/0039599 A1* | 2/2005 | Johnson et al. | ............ | 95/271 |
| 2008/0006519 A1* | 1/2008 | Badger | ............ | 202/96 |
| 2008/0264771 A1* | 10/2008 | Dam-Johansen et al. | ............ | 201/4 |

* cited by examiner

*Primary Examiner* — Cephia D Toomer
(74) *Attorney, Agent, or Firm* — O'Connor & Company; Ryan P. O'Connor

(57) ABSTRACT

Methods, process, apparatus, equipment, and systems are disclosed for converting biomass into bio-oil fractions for chemicals, materials, feedstocks and fuels using a low-cost, integrated fast pyrolysis system. The system improves upon prior art by creating stable, bio-oil fractions which have unique properties that make them individually superior to conventional bio-oil. The invention enables water and low-molecular weight compounds to be separated into a final value-added fraction suitable for upgrading or extracting into value-added chemicals, fuels and water. Initial bio-oil fractions from the process are chemically distinct, have low-water content and acidity which reduces processing costs normally associated with conventional bio-oil post-production upgrading since fewer separation steps, milder processing conditions and lower auxiliary inputs are required. Biochar is stabilized so that it can be handled safely. The integrated fast pyrolysis process includes biomass storage, preparation, pretreatment, and conversion, product recovery and processing to create and store stable biochar and bio-oil fractions.

20 Claims, 4 Drawing Sheets

METHODS FOR INTEGRATED FAST PYROLYSIS PROCESSING OF BIOMASS

FIELD OF THE INVENTION

The present invention generally relates to integrated process methods, apparatus, equipment and systems for converting biomass to chemicals, materials, and fuels using pyrolysis reactions and separations.

BACKGROUND OF THE INVENTION

Crude oil is a fossil-based resource used for the production of transportation fuels, heat and power, asphalt, chemicals, adhesives, pharmaceuticals, polymers, fibers and other products. The United States is a major importer of crude oil and thus is heavily reliant on foreign countries to meet demand.

The nation's dependence on imported oil has in part fueled demand for sound, renewable energy technologies. Wind and solar technologies provide renewable electricity and heat as do geothermal and tidal technologies. Lignocellulosic biomass, which is an organic material comprised of lignin, cellulose and hemicelluloses and derived from a variety of wood and biowaste feedstocks, represents the world's only renewable carbon resource for energy, fuels, chemicals and other biobased products.

Non-food biomass is an abundant and geographically-diverse, domestic resource, which the United States Department of Agriculture (USDA) estimates can be produced in quantities exceeding 1 billion dry tons annually (see Perlack, R. D.; Stokes, B. J.; et al. Biomass as feedstock for a bioenergy and bioproducts industry: The technical feasibility of a billion-ton annual supply, USDA-DOE, 2005). As noted above, biomass resources include agricultural residues such as corn stover, forestry and mill residues, wood, energy crops such as switchgrass, miscanthus, energy cane, algae, waste products from industrial processes and the like. Biomass is a sustainable feedstock for production of fuels, chemicals, specialty products, heat and electric power which can reduce the nation's dependence on foreign oil.

First generation biofuels, including biodiesel and grain ethanol are produced from food biomass crops. These products are being scrutinized over the perceived competition between food and fuel, net energy output and product incompatibility with existing infrastructure. Second generation biofuels are produced from non-food biomass using biochemical or thermochemical processing.

Biochemical conversion is a multi-step process that first separates biomass into fermentable sugars and lignin. The sugars are biochemically converted into biofuels while lignin is passed through the process unconverted reducing overall biomass conversion efficiencies. Biochemical conversion of biomass requires expensive, complex and selective enzymes and microorganisms which have been proven in the laboratory but not commercially.

Thermochemical conversion of biomass is a robust, high temperature pathway that can process 100% of lignocellulosic biomass. There are three major high temperature pathways: gasification, pyrolysis and combustion. Biomass gasification is a thermal process that produces a gas mixture called synthesis gas or syngas, which can be burned directly to produce heat and power or upgraded into advanced biofuels using Fischer-Tropsch synthesis, fermentation or other upgrading technologies. This type of process, however, requires massive, capital-intense facilities to become economical, and has limited demonstration history using biomass feedstocks (see Anex, R. P. Aden, A.; Kazi, F. K.; Fortman, J.; Swanson, R. M.; Wright, M. M.; et al. Techno-economic comparison of biomass-to-transportation fuels via pyrolysis, gasification, and biochemical pathways. Fuel 2010, 89, S29-S35). Direct biomass combustion or co-firing generates sensible heat that can be used to create electricity at existing facilities, but requires modified equipment to handle biomass. Furthermore, since heat from combustion cannot be easily stored, the heat energy must be used immediately.

Pyrolysis is the thermal decomposition of biomass in the absence of oxygen (see Bridgwater A V. Review of fast pyrolysis of biomass and product upgrading. Biomass and Bioenergy 2011, doi:10.1016/j.biombioe.2011.01.048). It is the only thermochemical process that directly produces a high yielding liquid, called pyrolysis oil (or bio-oil, biocrude oil, wood oil, pyroligneous acid or a number of related terms). Since the liquid product can be stored and transported, the pyrolysis process may be separated from end-use providing increased flexibility over gasification and direct combustion which involve heat and process integration. However, conventional bio-oil has poor properties that limit its application for petroleum replacement products. Poor properties include high water and oxygen content, acidity, instability, complex chemical nature and inability to blend with hydrocarbons (see Qi, Z.; Jie, C.; Tiejun, W.; Ying, X. Review of biomass pyrolysis oil properties and upgrading research. *Energy Conversion and Management* 2007, 48, 87-92.). Biomass pretreatment, catalytic pyrolysis and post-production upgrading are three schemes being developed to change the product or improve its properties.

Though conventional bio-oil has been combusted for heat and power generation, upgraded into fuels, and extracted into chemicals and materials it is not particularly suitable for any one application. Furthermore, high water content and acidity generally make it a poor fuel, corrosive and incompatible with existing liquid fuel infrastructure. High water content and oxygen make it difficult and expensive to catalytically upgrade conventional bio-oil into transportation fuels. The complex mixture of chemicals in conventional bio-oil make multiple-step extraction and separation processes necessary but time consuming and expensive in producing chemicals and other materials.

One of the challenges in biomass conversion is integrating biomass preparation and conversion with product upgrading and storage.

Another challenge is adapting to and processing different biomass feedstocks while producing a consistent product quality.

Another challenge is incomplete conversion of biomass. Biochemical processing cannot overcome resilient lignin structure reducing overall biomass conversion efficiency.

Another challenge is providing products compatible with existing fuel system infrastructure. Ethanol, biodiesel, syngas and conventional bio-oil among other renewable products have limited use in pipelines, engines, turbines, pumps and other equipment without significant retrofitting, redesign and capital improvements.

Another challenge is the inherent high capital costs for upgrading to hydrocarbon end products. Syngas upgrading using Fischer-Tropsch synthesis requires expensive gas clean-up units, operates at high temperatures, requires large and expensive high pressure vessels with unique metallurgy and involve catalysts. Hydrotreating, hydro-deoxygenation and hydrocracking of conventional bio-oil requires robust catalysts that minimize fouling and coking, are effective in the presence of water and acid, and do not deactivate quickly due to alkali contaminants present in pyrolysis oil. Purchasing or producing hydrogen required for pyrolysis oil upgrading is necessary to remove oxygen and is an expensive part of the process and may increase the carbon footprint of the overall process.

Another challenge is recovering the water soluble and water insoluble (e.g. pyrolytic lignin oligomers and other large molecular weight compounds) phases of conventional bio-oil. While both phases can be used independently and are improved feedstocks for fuels, chemicals and materials versus conventional bio-oil, they must first undergo a time consuming, expensive and intensive extraction process.

Another challenge is producing bio-oil that is versatile and is well-suited for multiple different products with properties that are particularly advantageous for each application.

Another challenge involves producing a stable, low-moisture, low-oxygen content and low-acidity bio-oil that is miscible (easily blends) with hydrocarbons. High acidity, moisture and oxygen content bio-oil does not mix with hydrocarbons, is corrosive and expensive to upgrade. Often expensive, multi-step high pressure and temperature catalytic processes are used to remove oxygen and reduce acidity (see Elliot, D. C., Hu, J., Hart, T. R., Neuenschwander, G. G., Battelle Memorial Institute (2011) *Palladium Catalyzed Hydrogenation of Bio-oils and Organic Compounds*, U.S. Pat. No. 7,956,224 B2.).

Another challenge is simplifying the chemical composition of bio-oil such that it is compatible with existing products and infrastructure or more easily, efficiently and cost effectively upgraded than conventional bio-oil.

Another challenge involves producing a stable and safe solid biochar co-product that resists spontaneous combustion once exposed to ambient conditions. Conventional biochar also remains a hazard in powder form as it is easily inhaled and easily ignited. Furthermore because it is easily airborne it is difficult to handle and apply to soil or use as a solid renewable fuel.

What are needed in the art are methods and apparatus that combine biomass preparation and conversion with product collection, upgrading and storage to form an integrated fast pyrolysis process that produces stable bio-oil fractions and safe biochar. A preferred integrated, low-capital cost, low-pressure fast pyrolysis process will produce distinct, value-added, stable, bio-oil fractions each having unique properties making them individually superior to conventional bio-oil for direct use or upgrading into fuels, chemicals and materials regardless of biomass feedstock.

SUMMARY OF THE INVENTION

The present invention addresses the aforementioned needs in the art by providing a novel and unique solution to the above challenges, as will now be summarized and then further described in detail below.

In some variations, the invention provides a method of integrated biomass fast pyrolysis and fractionation, the method comprising:

(a) providing a feedstock comprising biomass;

(b) introducing the prepared biomass to a reactor, operated under fast pyrolysis conditions, and in the presence of a heat carrier and/or a heated gas, to convert the biomass to a reaction mixture comprising condensable vapors, aerosol droplets, non-condensable gases, and solid biochar;

(c) removing at least some of the solid biochar from the reaction mixture, to produce an intermediate mixture comprising condensable vapors, aerosol droplets, and non-condensable gases;

(d) introducing the intermediate mixture to a multi-stage separator comprising at least one heated electrochemical separator followed by at least one heat exchanger, wherein the at least one electrochemical separator and the at least one heat exchanger are operated under effective conditions to collect individual liquid bio-oil fractions, including a final liquid bio-oil fraction, each derived from the condensable vapors and the aerosol droplets, wherein the at least one heat exchanger and the at least one electrochemical separator are operated with a heat exchanger wall temperature and an electrochemical separator wall temperature maintained above the water saturation temperature at the water vapor pressure determined within the heat exchanger and the electrochemical separator, respectively, such that water content is maximized in the final liquid bio-oil fraction;

(e) recovering and recycling at least some of the non-condensable gas from the intermediate mixture back into the reactor; and (f) recovering at least some of the solid biochar as a cooled, stable biochar product.

In some embodiments, the multi-stage separator comprises two or more electrochemical separators and/or two or more heat exchangers in series or parallel. Each electrochemical separator may be an electrostatic precipitator, electrostatic separator, electrodynamic separator, capacitor-based separator, or any other means or apparatus for employing the principles of separating by electrical forces. In preferred embodiments, each electrochemical separator is an electrostatic precipitator.

In some embodiments, the method further comprises reducing the particle size of the biomass, drying the biomass, or both of these steps. In certain embodiments, the biomass comprises about 10 wt % moisture or less and contains an average effective particle size of about 6 mm or less.

The biomass may be pretreated biomass selected from the group consisting of torrefied biomass, acid-treated biomass, enzyme-treated biomass, steam-treated biomass, washed biomass, density-modified biomass, viscosity-modified biomass, and any combinations thereof.

In some embodiments, the reactor in step (b) is a fluidized-bed reactor whose fluidizing gas includes at least some of the non-condensable gas recycled from step (e). In other embodiments, the reactor is an auger-type reactor comprising at least one auger for conveying the reaction mixture and the heat carrier. In embodiments employing auger-type reactors, the intermediate mixture may be substantially separated from at least some of the biochar and the heat carrier within the reactor. The biochar may be separated from the heat carrier, followed by recycling the heat carrier to step (b), and feeding the biochar to step (f), if desired.

In various embodiments, at least one of the bio-oil fractions is further treated by one or more techniques selected from the group consisting of heating, aging, blending, reacting, upgrading, refining, hydrotreating, adding an emulsifier, adding a surfactant, adding a chemical additive, and any combinations thereof.

Another variation of the invention provides a method of biomass fast pyrolysis and fractionation, the method comprising:

(a) providing a feedstock comprising biomass;

(b) introducing the biomass to a reactor, operated under fast pyrolysis conditions, and in the presence of a heat carrier and/or a heated gas, to convert the biomass to a reaction mixture comprising condensable vapors, aerosol droplets, non-condensable gases, and solid biochar;

(c) removing and recovering at least some of the solid biochar from the reaction mixture, to produce an intermediate mixture comprising condensable vapors, aerosol droplets, and non-condensable gases; and (d) introducing the intermediate mixture to a multi-stage separator comprising at least one heat exchanger and at least one electrochemical separator, wherein the at least one heat exchanger and the at least one electrochemical separator are operated under effective conditions to collect individual liquid bio-oil fractions, including a first liquid bio-oil fraction, each derived from the condensable vapors and the aerosol droplets, wherein at least one heat exchanger (such as a first heat exchanger in a series) is operated with a wall temperature maintained above the water saturation temperature at the water vapor pressure determined within the heat exchanger, to minimize water content in the first liquid bio-oil fraction.

In some embodiments, the multi-stage separator comprises two or more heat exchangers and two or more electrochemical separators, collectively integrated to collect multiple liquid fractions from the intermediate mixture. The multi-stage separator may include a first electrochemical separator disposed prior to (i.e., upstream of) a first heat exchanger.

The first heat exchanger is operated, in some embodiments, with a heat-transfer fluid maintained above 100° C. Optionally, at least one of the heat exchangers is a multi-zone heat exchanger with multiple temperature set-points.

The method may further comprise ionizing at least a portion of the aerosol droplets prior to introduction of the aerosol droplets into the electrochemical separator, to increase collection efficiency within the electrochemical separator.

Another variation of the present invention provides a method of biomass fast pyrolysis and fractionation, the method comprising:

(a) providing a feedstock comprising biomass;

(b) introducing the biomass to a reactor, operated under fast pyrolysis conditions, and in the presence of a heat carrier or a heated gas, to convert the biomass to a reaction mixture comprising condensable vapors, aerosol droplets, non-condensable gases, and solid biochar;

(c) removing at least some of the solid biochar from the reaction mixture, to produce an intermediate mixture comprising condensable vapors, aerosol droplets, and non-condensable gases;

(d) introducing the intermediate mixture to a multi-stage separator comprising at least one heat exchanger and at least one electrochemical separator, wherein the at least one heat exchanger and the at least one electrochemical separator are operated under effective conditions to collect individual liquid bio-oil fractions each derived from the condensable vapors and the aerosol droplets;

(e) recovering and recycling at least some of the non-condensable gas from the intermediate mixture back into the reactor; and (f) recovering at least some of the solid biochar as a cooled, stable biochar product, wherein heat contained in the solid biochar is integrated with any one or more of steps (a)-(e).

In some embodiments, step (f) comprises utilizing a portion of the non-condensable gas to enhance biochar cooling and recovery. In some embodiments, step (f) comprises introducing the biochar to a fluidized bed that is fluidized with the non-condensable gas. In these or other embodiments, step (f) comprises introducing an inert gas to elutriate the biochar out of a mixture with the heat carrier.

The method may further comprise producing agglomerated biochar including one or more added binders selected from the consisting of lignosulfonates, vegetable oil, water, whole bio-oil, bio-oil fractions, biomass, clay, bitumen, coal, and any combinations thereof.

BRIEF DESCRIPTION OF THE DRAWINGS

The advantages of the technology described may be better understood by referring to the descriptions below with the accompanying drawings. The drawings are not to scale and represent exemplary configurations that depict general principles of the technology. Dotted lines within the figures are representative of optional process streams or streams used during start-up, emergency or upset conditions and are included as part of the process.

DETAILED DESCRIPTION OF THE INVENTION

Figure 1:
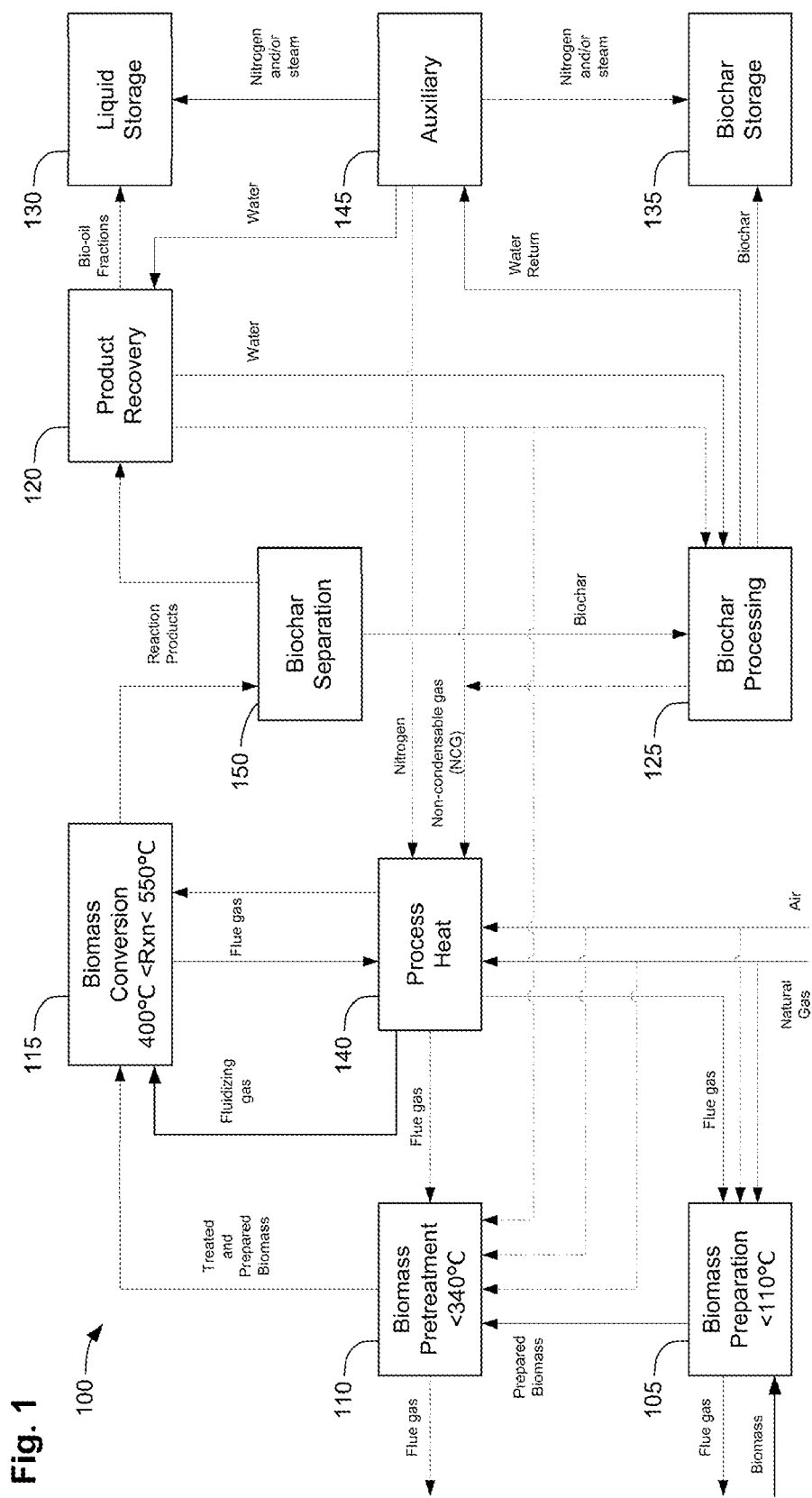
FIG. 1 provides an exemplary, low-cost, integrated fast pyrolysis process including biomass storage, preparation, pretreatment, and conversion using a bubbling fluidized bed reactor, product recovery and processing to create stable biochar and bio-oil fractions, heat integration and product storage.

The apparatus, devices, systems, and methods including the overall unique and novel integrated process of this invention will now be described in detail by reference to various non-limiting approaches, including the figures which are exemplary only.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The present invention may be practiced by implementing process steps in different orders than as specifically set forth herein. All references to a "step" may include multiple steps (or substeps) within the meaning of a step. Likewise, all references to "steps" in plural form may also be construed as a single process step or various combinations of steps.

The present invention may be practiced by implementing process units in different orders than as specifically set forth herein. All references to a "unit" may include multiple units (or subunits) within the meaning of a unit. Likewise, all references to "units" in plural form may also be construed as a single process unit or various combinations of units.

As used in this specification and the appended claims, the singular forms "a," "an," and "the" include plural referents unless the context clearly indicates otherwise.

Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are herein incorporated by reference, the definition set forth in this section prevails over the definition that is incorporated herein by reference.

Some variations of the present invention consist of an integrated method for pretreating and converting biomass into liquid bio-oil fractions, solid biochar, and non-condensable gas which are collected, processed, produced and recycled or stored at a fast pyrolysis facility. The particular combination of steps is integral to the low-cost production of value-added products including renewable asphalt binders, fuels, chemicals, and other products.

"Biomass," for the purposes of the present invention, is any material not derived from fossil resources and comprising at least carbon, hydrogen, and oxygen. Biomass includes, for example, plant and plant-derived material, vegetation, agricultural waste, forestry waste, wood waste, paper waste, animal-derived waste, and poultry-derived waste. The present invention may also be used for carbon-containing feedstocks other than biomass, such as a fossil fuel (e.g., coal, petroleum, oil and tar sands) and municipal solid waste. Thus, any method, apparatus, or system described herein in reference to biomass can alternatively be used with any other feedstock. Also, various mixtures may be utilized, such as mixtures of biomass and coal.

The methods and systems of the invention can accommodate a wide range of feedstocks of various types, sizes, and moisture contents. In some approaches of the invention, the biomass feedstock can include one or more materials selected from timber harvesting residues, softwood chips, hardwood chips, tree branches, tree stumps, leaves, bark, sawdust, off-spec paper pulp, corn, corn stover, wheat straw, rice straw, soybean straw, sugarcane bagasse, switchgrass, miscanthus, commercial waste, grape pumice, almond shells, pecan shells, coconut shells, coffee grounds, grass pellets, hay pellets, wood pellets, cardboard, paper, algae, or the torrefied version of any biomass materials listed above. Industrial by-products such as corn fiber from a wet-mill ethanol process or lignin from a cellulosic ethanol plant can also be feedstocks. A person of ordinary skill in the art will readily appreciate that the carbon based feedstock options are virtually unlimited.

Biomass Preparation and Storage

Figure 2:
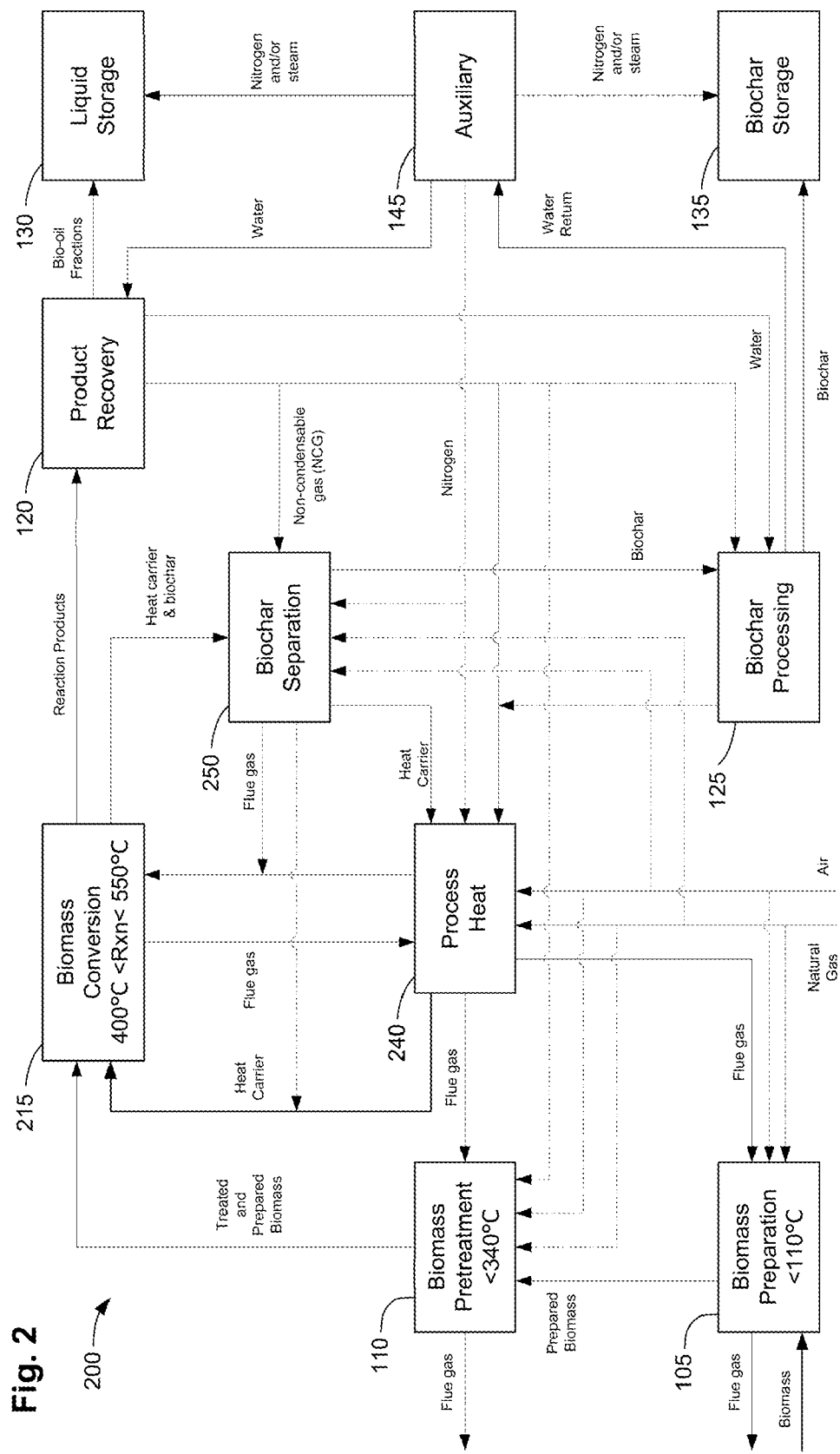
FIG. 2 provides an exemplary, low-cost, integrated fast pyrolysis process including biomass storage, preparation, pretreatment, and conversion using an auger reactor, biochar and heat carrier separation, product recovery and processing to create stable biochar and bio-oil fractions, heat integration and product storage.
Figure 3:
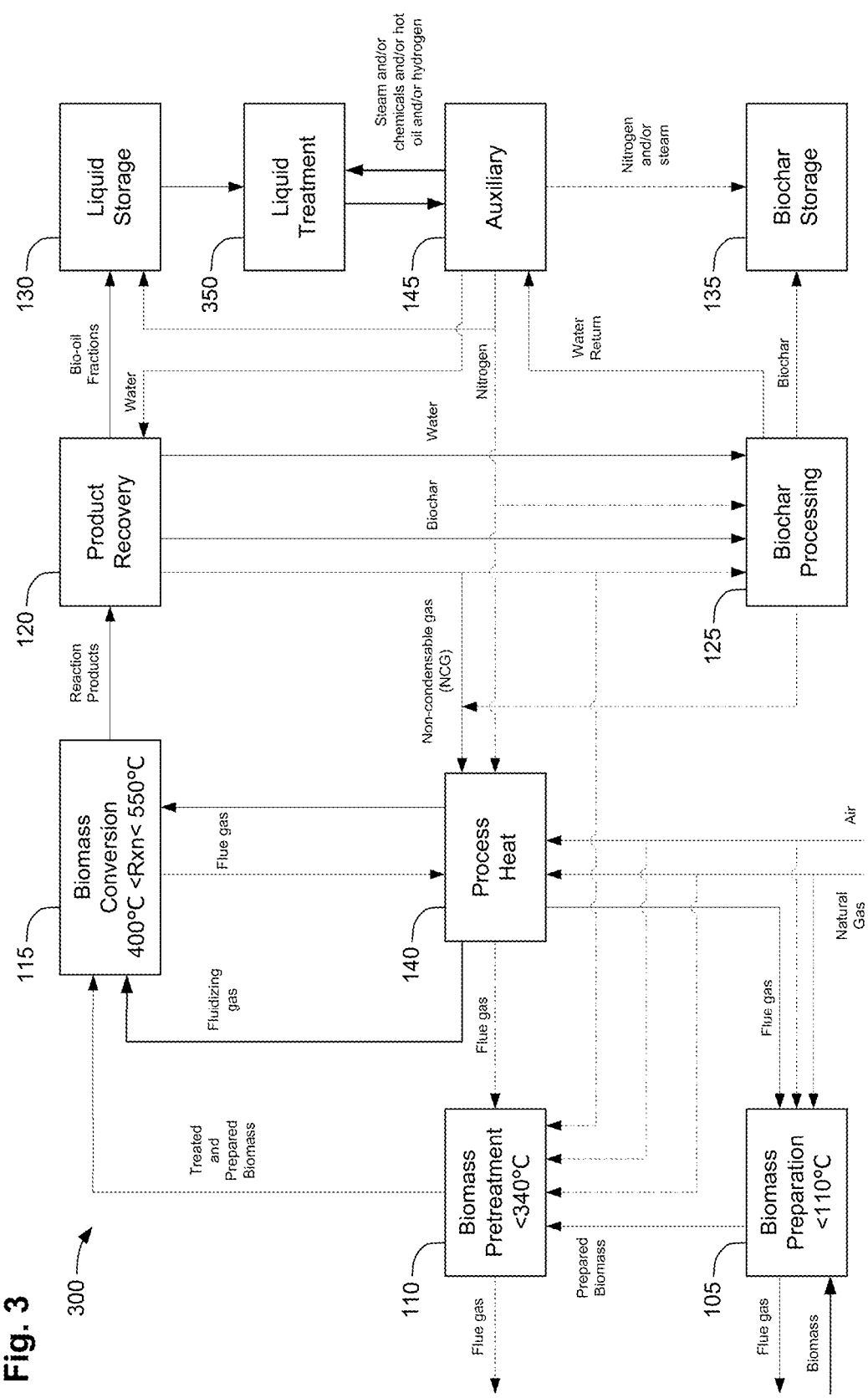
FIG. 3 provides an exemplary, low-cost, integrated fast pyrolysis process including biomass storage, preparation, pretreatment, and conversion using a fluidized bed reactor, product recovery, processing and liquid treatment to create direct petroleum product replacements, heat integration and product storage.

With reference to FIGS. 1 to 3, the purpose of unit 105 is to receive, store, dry, mill and further prepare biomass feedstock for conversion. As-received biomass is unloaded from the shipment vehicle and may be stored in bulk as bales in the case of corn stover, switchgrass, or similar biomass. Woody biomass may arrive as logs or chips and stored in piles, covered or uncovered buildings, silos bins, reclaimers or other means. Additional biomass types, such as algae, may be stored similarly.

Baled or similarly prepared biomass is fed into a chopper to provide a coarsely ground material less than 15 cm in length, in some approaches, before drying. Logged biomass is fed into a horizontal grinder to produce wood chips less than 15 cm in length, in some approaches. Chipped biomass less than 8 cm in length does not generally require grinding before drying. Biomass particles between 1 cm and 8 cm in length and less than 2 cm thick are a preferred size entering the dryer but other sizes can be accommodated if appropriate.

Chopped and chipped biomass is then dried. The purpose of the drying step is to provide material for feed with moisture content less than, for example, 10% by weight (wet basis). In various approaches of the process, feedstocks may be dried to a moisture content of about 5%, 10%, 15%, 20%, 25% by weight, or more.

The dryer may consist of a rotary drum, kiln, fluidized bed, torrefier, belt, bin or other direct or indirect contact drying device. Biomass, bio-oil, biochar, non-condensable gas and fossil based fuels may be combusted to provide heat for drying the biomass. Flue gas or steam may also be used to heat and dry biomass.

Cooled flue gas may exit the dryer to the atmosphere or is treated in a conventional fashion if necessary, with evaporated moisture driven off biomass. Dried biomass material is transported to a storage container, pile or grinder.

At this point it is preferable that dry biomass be milled to a uniform size prior to conversion. In some approaches, dried biomass that is between 6 and 60 mm in length is milled to a uniform size of less than 6 mm. In various approaches, dried biomass is milled to a uniform size of less than about 25 mm, 15 mm, 10 mm, 9 mm, 8 mm, 7 mm, 6 mm, 5 mm, 4 mm, 3 mm, 2 mm, or 1 mm. A grinder with a preferred screen size between 3.1 and 12.7 mm may be used to further prepare dry biomass. The grinder may consist of a hammermill, knife mill, pulverizer, vortex grinder, or other such device.

An additional biomass pretreatment unit 110 may be included in the process to further prepare the biomass stream entering unit 115 (FIG. 1 or 3) or unit 215 (FIG. 2). In a preferred approach this unit involves torrefying the biomass stream from unit 105 between 250° C. and 340° C. In general, torrefaction is a chemical reaction process that involves heating biomass slowly to temperatures between 250° C. and 340° C. in an inert environment. Torrefaction removes a portion of the hemicellulose biomass structure and residual moisture. Vapors from torrefaction or other gaseous or liquid fuels may be used to heat the endothermic process. Reducing hemicellulose in a pretreatment step is beneficial since this portion of the biomass may create low-molecular-weight compounds including acetic acid during pyrolysis. Torrefaction has the added effect of making biomass more friable, that is, brittle and easier to mill as well as imparting hydrophobic properties that may improve biomass storage characteristics and reduce bio-oil water content.

In another acceptable approach, biomass may be pretreated in unit 110 using acid pretreatment or water washing to remove alkali materials. In this variation, biomass leaving unit 110 would need to be dried to 10% moisture or less before entering unit 115 or 215.

Dried, milled and pretreated biomass is transported within unit 105 or 110 to a bulk storage location. Bulk biomass storage acts as a buffer for the conversion process in unit 115 or 215 should any repairs or maintenance be necessary upstream. In one approach, bulk storage may be one or more bins, silos, or reclaimers. Filters or cyclones may be used to remove particulate from the vent gas as bulk storage containers are filled. A headspace pad of nitrogen for sealed storage containers may be used to prevent moisture absorption from the outside atmosphere and to minimize dust explosion or fire hazards. Pressure relief valves may be used to control blanket pressure.

Prepared and/or pretreated biomass is fed to unit 115 or 215 from bulk storage. In a particular approach, material stored in bins or silos is unloaded using chains swinging round a vertical rotating shaft with flighting (agitator), a reclaimer or similar silo or bin unloader device. In another acceptable process approach, a reclaimer or walking floor is used to transport stored biomass. From bulk storage, the biomass is transported by a conveyor into the conversion facility. The conveyor may consist of a screw, belt, pneumatic transport or other such system. In the case of a screw or belt conveyor, a bucket elevator may be required to lift the material into a receiving area in unit 115 or 215.

Biomass Conversion

The purpose of unit 115 and/or 215 is to use thermal processing to convert prepared biomass to condensable organic vapors, aerosol droplets, solid biochar, and a non-condensable gas mixture. Biomass conversion is accomplished by maintaining specific reaction temperatures, an oxygen deprived environment, short vapor residence times in the reactor, and high heat-transfer rates at a plurality of control points. This conversion step takes place in a pyrolysis-type reactor. Fast pyrolysis is best performed under the following conditions: biomass particle sizes less than 3 mm in critical dimension, feedstock moisture content less than 10 wt %, rapid biomass heating rate on the order of 1000° C./s or greater, vapor temperatures between 450-500° C., oxygen deprived environment, vapor residence time less than 2 seconds, rapid cooling and collection of the pyrolysis vapors and aerosols into bio-oil.

Fast pyrolysis is a thermochemical process in which feedstock is rapidly heated in the absence of oxygen. The feedstock decomposes or depolymerizes to generate pyrolysis-type vapors, aerosols, biochar and non-condensable gas. Fast pyrolysis processes typically produce 60-75 wt % of liquid bio-oil, 15-25 wt % of solid char, and 10-20 wt % of non-condensable gases, depending on the feedstock and operating conditions used.

Condensable vapors include organic compounds that can be condensed upon cooling the product stream exiting a pyrolyzer. The organic compounds contain carbohydrates (such as carboxylic acids), alcohols, esters, furans, and phenolic compounds. Condensable water vapors will also be present.

Aerosol refers to discrete quantities of organic compounds present as solid particles and/or liquid droplets suspended in a gas phase. An aerosol droplet normally contains at least one compound that has a boiling point higher than the process temperature at this point in the process, or has not been subjected to sufficient heat transfer to fully vaporize. Aerosol droplets may form from vapor condensation after leaving the pyrolysis reactor as the mixture begins to cool. In the present context, aerosols tend to consist of carbohydrates (such as anhydrous sugars), phenolic compounds, and lignin derived oligomers exiting the reactor as liquids. Typically, the size (e.g., effective diameter) of aerosols is on the order of 1 μm or less, although larger aerosol particles are possible depending on the fluid dynamics surrounding the particle or droplet.

Non-condensable gases include hydrogen, carbon monoxide, carbon dioxide, methane, and other light hydrocarbons created during pyrolysis. Non-condensable gases may also include inert gases injected into the pyrolysis system. Typically, non-condensable gases represent about 10 wt % to about 25 wt % of pyrolysis products.

Biochar or char is a solid product of biomass pyrolysis. Fast pyrolysis conditions maximize liquid bio-oil yield and minimizes biochar yield. Both primary and secondary biochar formation occur in a fast pyrolysis process. Primary char or char is formed as a direct product of biomass pyrolysis. Secondary char is not a direct result of biomass pyrolysis, rather secondary reactions occurring when pyrolysis vapors, aerosols and bio-oil are converted into char and/or non-condensable gas due to high temperatures or the presence of primary char. Biomass with high lignin and ash content tend to increase primary char yields while slow heating rates, long vapor residence times and high pressures lead to secondary char formation. Secondary char formation should be minimized or eliminated in fast pyrolysis since it is created at the expense of bio-oil yield.

Any pyrolysis reactor may be used to pyrolyze the feedstock. Exemplary reactor configurations include, but are not limited to, bubbling fluidized bed reactors, circulating fluidized bed reactors, auger reactors, ablative reactors, rotating cones, entrained-flow reactors, vacuum moving-bed reactors, transported-bed reactors, fixed-bed reactors, and microwave-assisted reactors. Preferably, the selected pyrolysis reactor is capable of achieving rapid heat transfer to prepared biomass and providing short vapor residence times.

In some approaches of the present invention, prepared biomass from unit 110 and/or 115 is transferred to a receiving hopper, hoppers, or surge bins in unit 115 and/or 215. Nitrogen or other inert gas may be used to purge the solid biomass hopper of oxygen. The biomass is transferred from receiving hoppers to a feeder system. The feeder is used to meter and inject feed into the reactor.

Process heat must be provided to the reactor to carry out the endothermic reactions occurring between 400° C. and 550° C. The heat source may be electric, flue gas from combustion, steam, solid heat carrier, or another source or any combination thereof. Although in some approaches the reactions occur substantially in the absence of air and oxygen, reactor heating may be provided in part by partial combustion of biomass feedstock. Controlled amounts of oxygen may be fed into the reactor so as to regulate reaction temperature during pyrolysis.

In a particular approach, the reactor unit 115 is a bubbling fluidized bed containing a bed material and fluidized with a gas. Fluidizing gases are preferably preheated before entering the reactor as noted in unit 140. Flue gases leaving unit 115 may be used to preheat the fluidizing gas. In a preferred approach, fluidizing gas entering unit 115 is recycled non-condensable gas from unit 120. In another acceptable approach, pressurized nitrogen or hydrogen from unit 145 and preheated in unit 140 may be used to fluidize the reactor during start-up, operation, emergency, or upset conditions.

In another approach as depicted in FIG. 2, unit 215 the reactor includes an auger with one or more screws. The auger reactor uses mechanical agitation to convey and mix biomass with a heat carrier to pyrolyze the biomass.

In a preferred approach, a heat carrier is used to transfer process heat to prepared biomass in unit 115 (fluidized bed), unit 215 (auger reactor), or other reactors. The intimate contact between the heat carrier and biomass provides requisite rapid heat transfer. Upon contact with the heat carrier, prepared biomass will pyrolyze releasing vapors, aerosols, solid biochar and gaseous reaction products. The heat carrier may be inert solids such as steel or stainless steel shot, sand, silica, alumina, dolomite, olivine, or limestone, to name a few. The heat carrier, in some approaches, is a catalytic material (e.g., a metal oxide) that not only transfers heat but also imparts some ability to catalyze pyrolysis chemistry.

In one approach using a fluidized bed reactor in unit 115, the reaction product leaves the reactor and enters unit 150 where biochar is removed and the reaction product stream continues to unit 120.

In another approach using an auger reactor in unit 215, the reaction product stream leaves the reactor and directly enters unit 120 while large biochar particles not entrained with the reaction product stream are separated from the heat carrier in unit 250.

In some approaches in which an auger reactor is used, the feedstock and heat carrier are fed at one end of a reactor containing one or more screws. The screw(s) mixes the heat carrier and feedstock and conveys them through the reactor. The screw(s) geometry and speed can provide good control of the heat carrier residence time and mixing behavior. This mechanical mixing may eliminate the need for a fluidizing gas which dilutes the products. The heat carrier may be reheated in a separate vessel.

In some approaches, the pyrolysis reaction temperature is between about 300-600° C., such as about 400-500° C. Any effective reaction conditions can be used to pyrolyze the feedstock in the pyrolysis reactor. One skilled in the art can select a combination of temperature, pressure, and residence time that produces high liquid yields from the pyrolysis process. Or, the temperature, pressure, and residence time may be selected to increase biochar yields, if desired.

In some approaches, pyrolysis can be performed in the presence of a catalyst. Exemplary catalysts include heterogeneous catalysts (such as $SiO_2$—$Al_2O_3$, $Pt/SiO_2$—$Al_2O_3$, $WO_x/ZrO_2$, $SOx/ZrO_2$), zeolites, acid catalysts, clay catalysts (e.g., acidified or activated clay catalysts), Al-MCM-41 mesoporous catalysts, or activated alumina. In some approaches, a catalyst allows a lower temperature to be used, such as about 250-450° C.

In some approaches, the pyrolysis reaction pressure is between about 0 to about 2,000 psi, such as between about 0 to about 50 psi.

In some approaches, the pyrolysis gas residence time is between about 0.1 seconds to about 10 seconds, such as about 1-5 seconds.

In some approaches, vacuum pyrolysis is used. In this method, the feedstock is heated in a vacuum to decrease the gas residence time and boiling point and/or avoid adverse chemical reactions. Slow or fast heating rates can be used. Some approaches employ a temperature of about 450° C. and occur below atmospheric pressure (<720 mm Hg).

Product Recovery

The purpose of unit 120 is to uniquely collect and process condensable vapors, liquid aerosols, and non-condensable gas leaving unit 115, 150 and 215. In some variations, the present invention incorporates technology described in U.S. patent application Ser. No. 12/551,103 entitled "Bio-oil Fractionation and Condensation" filed Aug. 31, 2009 by Brown et al., which is incorporated by reference herein in its entirety.

Unit 120 is particularly important providing a distinguished, low-cost fast pyrolysis system for producing value-added products including renewable asphalt binders, fuels, chemicals and feedstocks from distinct liquid fractions.

In some approaches, various combinations of condensers (such as shell-and-tube heat exchangers) and electrochemical separators (such as electrostatic precipitators) are configured to collect individual liquid products comprising pyrolysis oil fractions. Condensers and electrostatic precipitators are simple, low maintenance, commercially proven equipment used in all types of industrial applications. This same technology can be employed to produce value-added bio-oil fractions with superior properties compared to conventional bio-oil. The present invention further integrates these unit operations with auxiliary fast pyrolysis equipment and improves upon prior art by providing a complete package for efficient, low-cost production of unique bio-oil fractions.

This technology and the combination of equipment provide a value-added bio-oil product that is much more cost effective than combining fast pyrolysis with high-temperature, high-pressure Fisher Tropsch technology to create liquid fuels. Similarly, the invention reduces post-production upgrading costs normally associated with conventional bio-oil post-production by simplifying the product(s) into chemically distinct fractions which require fewer separation steps, milder processing conditions and lower auxiliary inputs.

The presence of both one or more condensers as well as one or more electrochemical separators exploits the different behavior and properties of vapors and aerosols exiting the pyrolysis reactor in order to collect chemically unique liquid products. Condensers are devices that are well-known in the art but are uniquely integrated into this process. A liquid-cooled heat exchanger may be employed. Exemplary condensers include a Liebig condenser, a Graham condenser, a Dimroth condenser, and a spiraled finger condenser.

Shell-and-tube heat exchangers may also be utilized to collect condensable vapor products. Shell-and-tube heat exchangers may use water, a water/glycol mixture, oil, steam or another fluid as heat transfer medium. Temperature control of the heat exchanger may be provided by using forced air-liquid or liquid-liquid heat exchangers, coolant reservoirs, chillers, ground water, boilers, and/or other techniques.

While preferred approaches of the present invention utilize electrostatic precipitators, it should be noted that the invention is not so limited. Generally speaking, in preferred approaches, the product recovery unit 120 utilizes at least one electrochemical separator capable of separating aerosol particles using electrical forces. "Electrochemical separators" as intended herein may include electrostatic precipitators, electrostatic separators, electrodynamic separators, capacitor-based separators, and other means or apparatus for employing the principles of separating by electrical forces.

Electrostatic precipitators are designed to collect aerosol droplets and particulate using electric field forces as opposed to condensation. Electrostatic precipitators work by charging particles, then collecting the charged particles in an electric field. Charging occurs by two mechanisms: diffusion charging and field charging. In diffusion charging, ions in the gas bounce around due to Brownian motion, bump into a particle, and transfer their charge to it. Field charging occurs when a particle is located within an electric field that contains ions.

In the context of the present invention, electrostatic precipitators, when used, separate and collect liquid aerosols from the product stream. Electrostatic precipitators use a high-voltage power supply to create an electrical potential difference between discharge electrodes and collecting electrodes in order to capture charged or polarized aerosols.

In some approaches, an electrostatic precipitator includes one or more tubes, channels or ducts that the gas and vapors flow through, acting as an electrical ground and collection surface for the aerosols. A discharge electrode is suspended in the center of the pipe, acting as the high voltage (e.g., ±20-60 kV DC) electrode. The high voltage applied to the electrode causes an electrostatic field to be formed between the electrode and the grounding channel. This field projects a force on any particle (aerosols or particulate) that passes through it. As the particle passes through the field, it moves towards the ground wall and thus collects on the wall. Gravity forces these aerosol-derived liquids to flow down the electrostatic precipitator to be collected. The electrostatic precipitator uses a positive or negative polarity power supply.

In exemplary approaches, there are five subunits contained within unit 120, namely three heat exchanger subunits and two electrostatic precipitator subunits, configured in series with a heat exchanger followed by an electrostatic precipitator, then another heat exchanger, then another electrostatic precipitator, and finally a last heat exchanger. Each subunit may contain multiple heat exchangers or electrostatic precipitators in series or in parallel configurations. Many other configurations are possible, including (but not limited to) those variations described in U.S. patent application Ser. No. 12/551,103.

In one approach, the first subunit in the product recovery unit 120 is a heat exchanger designed to condense and collect vapors flowing under laminar conditions from unit 150 or 215. The liquid-liquid heat exchanger may operate at a constant temperature, or at a varying temperature, to collect the first liquid fraction. To prevent build up on the heat exchanger walls, the heat exchanger should be operated at temperatures higher than 75° C. The heat exchanger may be designed to operate with a coolant maintained at 75-150° C. and the ability to cool the inlet stream temperature down to 90-200° C., for example. In various approaches, the heat exchanger has the ability to cool the inlet stream down to about 90° C., 100° C., 110° C., 120° C., 130° C., 140° C., 150° C., or higher. In some approaches, the extent of cooling is selected to allow for the condensation of a particular species, or class of molecules, of interest as a function of temperature, pressure, and overall concentrations.

Laminar flow conditions in the first heat exchanger help prevent the impacting and collection of aerosol droplets on the condenser walls. However, the flow conditions may include local regions of turbulence, turbulent eddies, instabilities, flow transitions, and transients that depart from true laminar flow. In preferred approaches, the calculated flow Reynolds number, on average and at steady state, predicts substantially laminar flow.

In some approaches, the second subunit in the product recovery unit 120 is an electrostatic precipitator operating isothermally above the dew point of water to collect at least some of the aerosol droplets present in the reaction stream, thereby producing a second liquid fraction. The electrostatic precipitator may be heated using electrical heat, heat transfer fluid such as oil, steam, flue gas, water/glycol mixtures or other such methods.

In some approaches, the third subunit in the product recovery unit 120 is a second heat exchanger designed to operate at a constant temperature above the dew point of water to condense and collect a third liquid fraction. As an alternative, the heat exchanger may be designed to operate at a temperature above the dew point of another species besides water, or a temperature selected for other reasons.

In some approaches, the fourth subunit in the product recovery unit 120 is a second electrostatic precipitator designed to operate isothermally to remove at least some of the aerosol droplets still present, thereby producing a fourth liquid fraction.

In some approaches, the fifth subunit in the product recovery unit 120 is a final heat exchanger designed to operate at a low (at or below atmospheric) temperature, preferably at which water vapor will condense to recover a fifth liquid fraction. This heat exchanger is preferably operated at a temperature low enough to condense remaining water and low molecular weight compounds.

Preferably, each heat exchanger has a unique coolant temperature selected such that the liquids condensing in each stage do not congeal on the walls, preventing unwanted secondary reactions and equipment fouling. Relatively warm coolants and equipment surfaces are thus preferred. In some approaches, the coolant temperatures and equipment surfaces may be controlled (adjusted) based on, for example, compositions of one or more liquid products, to account for secondary reactions that may be occurring.

Preferably, each electrostatic precipitator has a unique operating temperature selected such that vapors do not condense in each stage and aerosol droplets are primarily collected. In some approaches, each electrostatic precipitator has a unique operating temperature selected such that vapors condense in each stage and are collected with aerosol droplets.

In some approaches, temperatures in each stage are selected to be consistent with known saturation temperatures for chemical species of interest. In some approaches, temperatures in each stage are selected in the context of the overall energy balance, or for economic reasons, or for equipment-specific reasons, for example.

In certain approaches, there are between two and four subunits contained within unit 120 including at least one heat exchanger and at least one electrostatic precipitator. These subunits are configured to recover at least one liquid fraction derived from the organic vapors from pyrolysis and at least one liquid fraction derived from the aerosols from pyrolysis (or forming downstream of the pyrolysis reactor).

It would generally be preferable to start the sequence with a heat exchanger to avoid a high-temperature stream entering an electrostatic precipitator. However, it is possible to start the recovery sequence with an electrostatic precipitator (or another type of electrochemical separator), particularly one adapted for higher temperatures. This configuration may allow for the fast removal of primary aerosols from pyrolysis, before secondary aerosols may form.

In other approaches, there are between two and ten subunits contained within unit 120 including liquid-liquid heat exchangers and electrostatic precipitators. It will be recognized by a skilled artisan that many numbers and combinations of heat exchangers and electrostatic precipitators are possible in the present invention.

Depending on the number of subunits in the recovery unit 120, there will be multiple liquid products, such as two, three, four, five, six, seven, eight, nine, ten or more distinct liquid products (fractions), generally with different physical properties and chemical compositions. Chemical species that may be present in the liquid products include, for example, furans, carbohydrates, acetic acid, levoglucosan, syringols, guaiacols, aldehydes, ketones, phenolic compounds, and water.

In preferred approaches, the material entering unit 120 is fractionated such that water and acids are separated from high-molecular-weight organic compounds, resulting in one or more liquid products having lower water, acidity, and oxygen levels than the other liquid products.

Initial fractions have low water content and acidity and tend to contain high amounts of carbohydrates (e.g. anhydrosugars) and lignin derived oligomers making them suitable for use as materials and chemicals (e.g. asphalt binders, adhesives, diluents), as candidates for extracting fermentable sugars and catalytic upgrading into fuels. Middle fractions have low water content and acidity and tend to contain high amounts of phenolic compounds and furans making them suitable for catalytically upgrading into fuels and chemicals (e.g. diluents). The final fraction(s) contain high amounts of water and low molecular weight compounds (e.g. acetic acid) making it suitable for reforming into hydrogen or fuels; direct use, extraction or distillation into chemicals (e.g. acetic acid, drilling or hydraulic fracturing fluids) and use as water make-up.

Liquid products collected by electrostatic precipitators and heat exchangers are pumped separately to unit 130 for storage, blending, and shipping. Piping from the collection unit to the storage area is expected to be heated (electrically or with a heat transfer fluid) or well-insulated to reduce the viscosity of some liquids and prevent freezing.

Non-condensable gas from unit 115 and 215 is cleaned before leaving unit 120. Non-condensable gas may pass through filters, a packed bed, liquid scrubber or similar to remove remaining vapors (including water) or fine aerosols before being reheated in unit 125, 140, 240, and/or 250 and used as a fluidizing gas in unit 115 and/or 125, and/or used as a fuel source in unit 110, 140, 240, and/or 250.

Biochar Separation

The purpose of unit 150 and 250 is to recover biochar for processing in unit 125.

In a particular approach where a fluidized bed reactor is used in unit 115, biochar is separated from the reaction product stream using one or more cyclones in unit 150. The use of cyclones is a standard method to remove solids from a gas stream. Additional filters may be used in conjunction with or in place of cyclone filters. Cyclone filters must be maintained at reactor temperature and be well insulated or heated to prevent condensation and fouling.

In another approach where an auger reactor is employed in unit 215, heat carrier and the biochar leave the reactor and are separated or combusted in unit 250. If the biochar is combusted in unit 250 the heat carrier may be hot enough to be recirculated directly into unit 215. If biochar is combusted in unit 250, ash must be separated from the heat carrier, for instance by a cyclone in the flue gas stream. In a preferred approach, the biochar is separated in unit 250, the heat carrier is reheated using process heat in unit 240 and recirculated back into unit 215.

In another approach, unit 250 may be a fluidized bed of biochar and heat carrier from the reactor. In this case, fluidizing gas which could include non-condensable gas may purposefully elutriate biochar out of the bed to be collected using a cyclone while the reactor heat carrier leaves the bed to be reheated in unit 240.

In a particular approach, biochar and ferrous heat carrier are separated in unit 250 using magnets, screens, sieves, shakers, fluidized beds, augers and the like.

In another approach, biochar and non-ferrous heat carrier are separated in unit 250 using screens, sieves, shakers, fluidized beds, augers and the like.

In another approach, biochar and heat carrier are exposed to an oxidizing environment in unit 250 to combust the biochar for providing heat to reheat the heat carrier.

Biochar, once separated and recovered from unit 150 in the case of a fluidized bed reactor or 250 in the case of an auger reactor, is transported to unit 125 for additional processing.

Biochar Processing

The purpose of unit 125 is to create a unique, safe, storable and stable biochar product. Hot biochar between 300° C. and 600° C. is received from unit 150 and 250 by mechanical or pneumatic conveying. Upon leaving unit 125, biochar is preferably less than 60° C. and is ready for storage in unit 135.

Unit 125 may include cooling the biochar in a heat exchanger by directly or indirectly transferring heat to a heat transfer medium. The heat transfer medium may include water, bio-oil, non-condensable gas, flue gas, nitrogen, steam, air or other substance.

In one particular approach, unit 125 may be a vessel with a bed of biochar and fluidized with non-condensable gas or nitrogen which also acts as a heat-transfer medium. The bed may include an internal cooling loop to further remove heat. Recycled water from unit 120 may be used in the cooling loop. Fine char elutriating from the bed may be captured by one or more cyclones and re-introduced to the bed with a dipleg. A drop pipe in the center of the freeboard may be used to remove cool biochar from the bed.

In another approach, a conveyor is used to transport and cool the biochar from unit 150 and 250. The conveyor may include a spray quench system to directly cool the biochar with a heat-transfer medium, or an external cooling jacket.

In yet another approach, the biochar processor may be used to simultaneously cool and process the biochar into pellets, granules, briquettes, balls or other similar form. Thus the biochar product may be processed in a pelletizer, granulator, pin mixer or other type of agglomerator. Binders or additives may be added to create a uniform, compacted biochar. Binders may include lignosulfonates, water, bio-oil, vegetable oil, biomass, clay or other material. The binder may also act as a heat transfer medium. Conditioned biochar may be exposed to ambient conditions when sufficiently cooled. Stable, conditioned biochar is transported to unit 135 for storage.

Biochar Storage

The biochar product received from unit 125 is ready to be stored in unit 135, if desired. Biochar may be stored in steel bins, tanks, tankers, bulk bags, trailers, railroad cars or other containment method and may be piled in ambient conditions. Inert purge gas may be used to remove oxygen from storage areas for safety. Biochar in storage is ready for shipment and use beyond the biorefinery.

Biochar may be transported in and out of unit 135 via conveyor, pneumatic line, front-end loader bucket or other method.

Liquid Product Storage and Blending

The purpose of unit 130 is to collect and store the liquid product fractions recovered in unit 120. Tanks used to store the product are sized according to the amount of liquid produced and the desired storage duration. A liquid retention dike may be located around the storage area to quarantine potential leaks or spills.

Materials of construction can include stainless steel, lined carbon steel, various polymers, or other materials or coatings resistant to corrosion.

Liquids stored in unit 130 may be kept under an inert gas blanket to prevent oxidation, aging, or other quality issues. This blanket also minimizes release of light volatiles from the tanks Storage tanks may be insulated and heated to reduce viscosity for pumping and to prevent freezing in cold weather. Tanks may be heated electrically, or using hot oil or steam coils. Tanks may be mechanically agitated, in some approaches.

From storage tanks, individual liquid fractions may be pumped to a blending unit to combine liquid fractions in specified ratios. The blending unit is equipped with metering equipment to mix custom blends. An insulated, heated and agitated blend tank may be used to store and certify the blended product before shipment. A loading rack is required to fill drums, trucks or shipping containers for transport.

Liquid Treatment

The purpose of unit 350 in FIG. 3 is to treat bio-oil fractions or combinations of fractions from unit 130 or 120 prior to commercial sale. In some variations, the present invention incorporates technology described in U.S. Non-Provisional patent application Ser. No. 12/772,945 entitled "Asphalt Materials Containing Bio-oil and Methods for Production Thereof" filed May 3, 2010 by Williams et al., and U.S. Non-Provisional patent application Ser. No. 13/149,183 and PCT International Patent Application No. PCT/US11/38577 entitled "Bio-oil Formulation as an Asphalt Substitute" both filed May 31, 2011 by Williams et al. which are incorporated by reference herein in their entireties.

In one approach, the liquid treatment may take place in the blend tank in unit 130. Treatment may include heating, aging, filtering, adding an emulsifier or surfactant, introducing chemical additives, adjusting the pH or acid content, or any other treatment using a device or material that modifies the product or blend before shipment.

In another approach, liquid treatment in unit 350 may include a conversion process that upgrades the low-water content bio-oil fractions from unit 130 into value-added fuels, chemicals, and/or other products. Hydrogen may be added to a catalytic reactor (with a Pt- or Ni-based catalyst, for example) to produce transportation fuels including green diesel, jet fuel, or gasoline. A liquid product may be converted to a fuel or chemical product through reaction with hydrogen gas, or with a species that contributes hydrogen. Species that may contribute hydrogen include acids, metal hydrides, water in the water-gas shift reaction, an alkane in a dehydrogenation reaction, and so on.

In yet another approach, the liquid treatment may yield one or more refinery feedstocks that can be blended or co-refined with existing infrastructure. Of course, such liquid treatments may be carried out at another location as well, such as at a refinery or other operation. The process provides sufficient flexibility that for commercial reasons, it may be preferred to produce and distribute liquids that can be dropped into existing operations without the need for the user to further treat the liquid first.

In some embodiments, one or more bio-derived products produced by the present invention are further used as described in U.S. Provisional Patent App. No. 61/486,304 entitled "Methods, Apparatus, and Systems for Incorporating Bio-Derived Materials into Oil Sands Processing," filed May 15, 2011 or in U.S. Provisional Patent App. No. 61/491,188 entitled "Compositions, Methods, Apparatus, and Systems for Incorporating Bio-Derived Materials in Drilling and Hydraulic Fracturing," filed May 28, 2011. These patent applications are incorporated by reference herein in their entireties.

Process Heat

Process heat for the reactor, fluidizing gas, and/or heat carrier in unit 115 and 215 is provided in unit 140 and 240, respectively.

In one approach, the fluidizing gas stream for unit 115 must be preheated in unit 140 to maintain optimal reaction conditions.

Preheating fluidizing gas may be accomplished using a burner system fueled by natural gas, propane, bio-oil, biomass, syngas or other fuel including non-condensable gas. Combustion air entering unit 140 and 240 may be pressurized using a blower. Fluidizing gas is preheated by combustion flue gas in a heat exchanger. Flue gas from unit 140 and 240 may provide additional indirect heating for other unit operations including the reactor shell in unit 115 and 215, the biomass dryer in unit 105 and biomass pretreater in unit 110 and combustion air. Once cool, flue gas is released to the atmosphere.

Fluidizing gas may include non-condensable gas from unit 120 and 220, nitrogen, hydrogen, steam, air or other fluid. A blower may be necessary to pressurize fluidizing gas entering unit 115 and 215. Once heated to 300-600° C., for example, non-condensable gas may be fed into the reactor system.

In another approach, using an auger reactor or another reactor type in unit 215, fluidizing gas may not be required. However, a heat carrier such as steel shot, catalyst, silica sand, or other materials must be heated to maintain reactor operating conditions. Non-condensable gas from unit 120 may be combusted in a burner system with another fuel such as natural gas or propane to preheat heat carrier in unit 240 from unit 250. Hot flue gas from the burner may either directly or indirectly transfer heat to the heat carrier and the reactor.

In another approach, heat carrier from unit 250 is reheated using a direct or indirect heat exchanger in unit 240. Heat may be transferred to the heat carrier using flue gas, non-condensable gas, steam, direct combustion of biochar within heat carrier mixture, or by other means. Once heat carrier is between 400-700° C., in some approaches, it is recirculated and fed into the auger reactor in unit 215.

If any residual biochar remains on the heat carrier from unit 250, it may be advantageous to directly combust the biochar with non-condensable gas and/or another fuel and air so that biochar is removed and heat carrier is heated.

Auxiliary Systems

The purpose of unit 145 is to provide auxiliary utilities for the integrated fast pyrolysis process. These systems include compressed air, potable water, fire water, drinking water, chilled water, steam, pressurized nitrogen, electric power, natural gas and other necessary utilities.

Water may be sourced from a well or obtained from local supplies including pipelines, ponds, rivers, or lakes. Compressed air is generated using a compressor. A chiller supplies chilled water. A boiler may be used to provide steam. Pressurized nitrogen may be supplied with a nitrogen generator or purchased. Power may be brought in from a nearby grid, or generated within the biorefinery site. Natural gas may be supplied from local pipelines or wells.

In another approach, the integrated fast pyrolysis and fractionation process may be co-located with an industrial processing facility so as to provide mutual benefit to one another and add another level of integration. Co-location of an integrated biomass fast pyrolysis and fractionation processing plant with an existing facility (e.g., grain/cellulosic ethanol plant, pulp and paper mill, lumber mill, soybean crusher, power plant, oil sand processor, hydrocarbon drilling operation, etc.) may provide access to utilities and auxiliary infrastructure.

The integrated biomass fast pyrolysis and fractionation process is able to use many different feedstocks including lignocellulosic biomass and other carbon-based energy sources. In certain approaches, industrial facilities cannot completely process incoming feedstocks into value added outputs. The unconverted feedstock is often considered a byproduct. For example, corn fiber from wet mill corn ethanol plants and lignin from cellulosic ethanol process are two such byproducts, among others. These byproducts are often sold for much less than the primary product or used as low-value energy sources.

In some approaches, co-locating integrated biomass fast pyrolysis and fractionation plants with existing processing facilities can create a number of synergistic advantages. An integrated biomass fast pyrolysis and fractionation process can convert biobased byproducts into value-added products (specifically including biobased asphalt, fuels, chemicals, specialty products and biochar) to supplement the primary product revenue stream. At the same time, integrated biomass fast pyrolysis and fractionation plants will be able to share utilities, site permitting, logistics, management and other resources.

In another approach, co-locating an integrated biomass fast pyrolysis and fractionation process plants may reduce a processing facility's life-cycle analysis or greenhouse gas (GHG) footprint. Fast pyrolysis products can offset fossil resource use at a processing facility. Reducing natural gas, coal, diesel and other fossil resources with renewable products is a way to meet renewable energy mandates, renewable portfolio standards, reduce carbon footprint and dependence on fossil sources while improving sustainability.

EXAMPLE

The Example set forth below is for illustrative purposes only and is not intended to limit, in any way, the scope of the present invention.

Example

Pilot-Scale Integrated Fast Pyrolysis Process

By way of example, the integrated biomass fast pyrolysis and fractionation process was demonstrated using a pilot scale system located at the BioCentury Research Farm in Boone County, Iowa. Red oak biomass was received in bulk bags on a transport trailer. The bulk bags were unloaded from the trailer and placed in storage. The biomass arrived having 8 wt % moisture and was roughly chipped to 2.5 cm minus.

The chipped biomass was not dried any further since it arrived with less than 10 wt % moisture. The biomass was milled in a hammer mill to 3.2 mm minus using a 3.2 mm screen size. The biomass was not pretreated in unit 110, rather, it was transported directly to the receiving hopper in unit 115.

A bucket elevator in unit 115 conveyed biomass from the receiving hopper to a surge hopper. The surge hopper was purged with nitrogen to remove oxygen. A feeder below the surge hopper metered biomass into a bubbling fluid bed reactor.

The 15.2 cm diameter bubbling fluidized bed reactor was electrically heated to maintain bed temperature near 500° C. About 180 standard liters per minute of nitrogen gas fluidized the bed of sand. Prepared biomass entered the reactor at about 5.5 kg/hr. Upon contact with the hot bed of sand the biomass pyrolyzed forming a reaction product stream of vapors, aerosols, biochar and non-condensable gas. The product stream passed through a set of cyclone filters where the biochar was removed.

Biochar was collected in sealed steel containers and allowed to cool to atmospheric temperature before transporting to sealed drums for storage.

The remaining product stream entered a condenser in unit 120. The working fluid in the condenser was maintained at 85° C. and condensed vapors into bio-oil fraction 1.

Following the condenser was an electrostatic precipitator maintained at 115° C. The electrostatic precipitator collected aerosols from the product stream which formed bio-oil fraction 2. The electrostatic precipitator used a high voltage power supply set at −30 kV.

The remaining product stream then entered a second condenser maintained at 65° C. Product stream vapors were condensed here forming bio-oil fraction 3.

A second electrostatic precipitator was maintained at 65° C. The precipitator collected aerosols from the product stream forming bio-oil fraction 4. The second electrostatic precipitator used a high voltage power supply set at −30 kV.

A third and final condenser was set at 22° C. to condensed and concentrate water and low molecular weight compounds into liquid bio-oil fraction 5. Non-condensable gas then passed through a packed bed filter to clean the gas.

In this case the non-condensable gas was not recirculated to fluidize the bed; rather, it was sent to a flare and combusted.

Liquid bio-oil fractions were collected and stored inside in plastic containers until further processing or use.

Bio-oil fractions, biochar and non-condensable gas yield for this particular example are provided in Table 1. The yields are the result of an experiment lasting approximately 120 hours.

TABLE 1

Pilot scale fast pyrolysis process yield

| | Yield (wt % of biomass) | | | | | | |
|---|---|---|---|---|---|---|---|
| | Bio-oil Fraction | | | | | | |
| Product | 1 | 2 | 3 | 4 | 5 | Biochar | Non-condensable gas |
| Run 1 | 7 | 15 | 5 | 2 | 25 | 15 | 31 |

Figure 4:
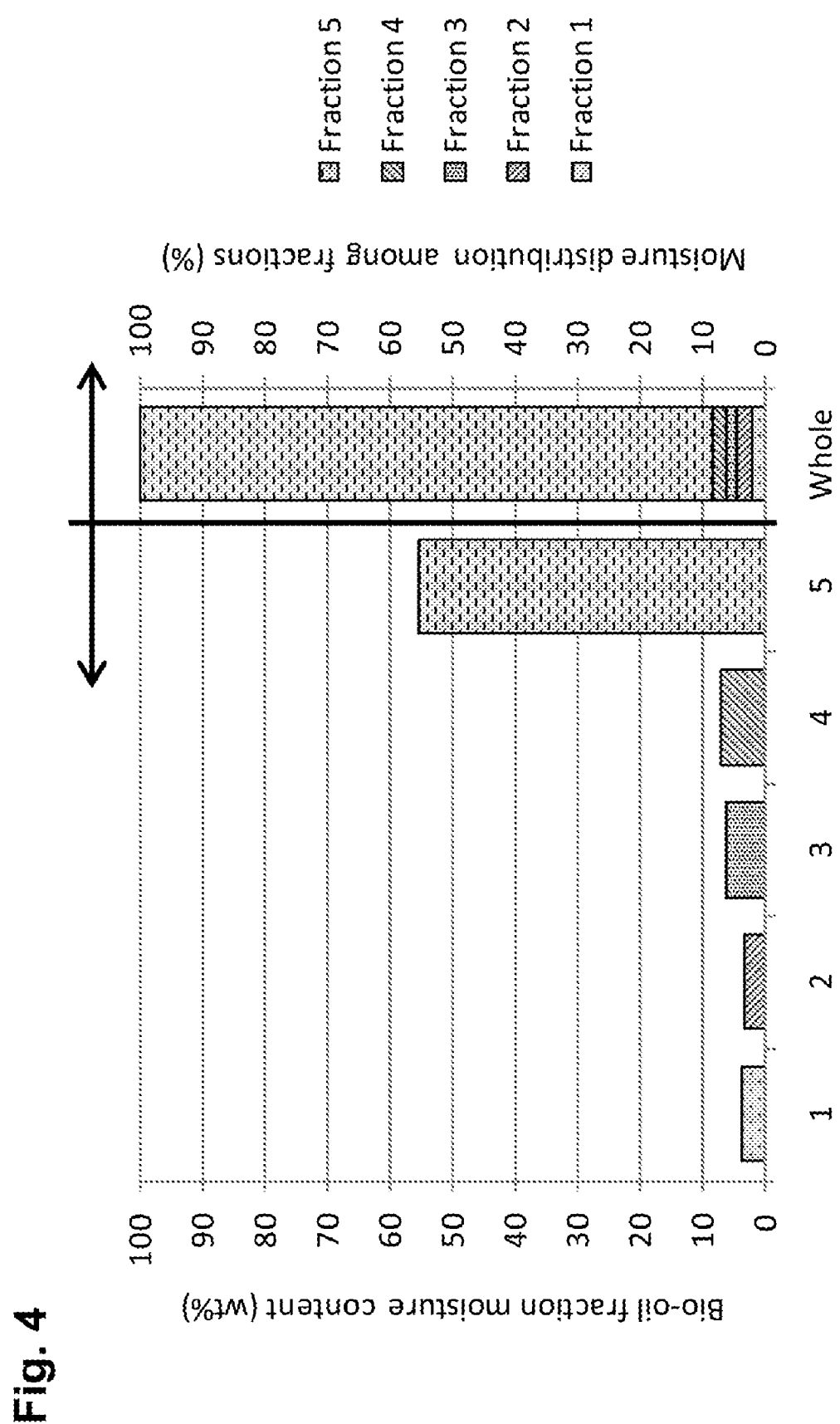
FIG. 4 provides analytical data of bio-oil fraction moisture content and moisture distribution among fractions as produced from a pilot plant, integrated fast pyrolysis process.

Moisture content of each individual fraction as well as the distribution of moisture among all fractions is provided in FIG. 4. Over 90% of the total moisture distributed among fractions is concentrated into the final liquid bio-oil fraction 5. Fractions 1-4 individually contain less than 10 wt % moisture which is markedly lower than conventional bio-oil which typically contains 25 wt % (see Bridgwater, A V. "The Production of biofuels and renewable chemicals by fast pyrolysis of biomass." *Int. J. Global Energy Issues* 27.2 (2007).).

Bio-oil fractions from this example have been used directly for a bioasphalt demonstration and R&D for applications including fuel oil, catalytic upgrading into fuels, specialty chemicals and other applications without expensive processing and auxiliary equipment that would surely be required for conventional bio-oil.

In this description, reference has been made to multiple approaches to the process, equipment, and systems that constitute this unique, integrated, biomass fast pyrolysis and fractionation invention. The accompanying drawings show by way of illustration, specific exemplary approaches of the invention. These approaches are described in sufficient detail to enable those skilled in the art to practice the invention, and it is to be understood that modifications to the various disclosed approaches may be made by a skilled artisan.

Where methods and steps described above indicate certain events occurring in certain order, those of ordinary skill in the art will recognize that the ordering of certain steps may be modified and that such modifications are in accordance with the principles of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The approaches, variations, and figures described above provide an indication of the utility and versatility of the present invention. Other approaches that do not provide all of the features and advantages set forth herein may also be utilized, without departing from the spirit and scope of the present invention. Such modifications and variations are considered to be within the scope of the principles of the invention defined by the claims.

What is claimed is:

1. A method of integrated biomass fast pyrolysis and fractionation, said method comprising:
   (a) providing a feedstock comprising biomass;
   (b) introducing said prepared biomass to a reactor, operated under fast pyrolysis conditions, and in the presence of a heat carrier and/or a heated gas, to convert said biomass to a reaction mixture comprising condensable vapors, aerosol droplets, non-condensable gases, and solid biochar;
   (c) removing at least some of said solid biochar from said reaction mixture, to produce an intermediate mixture comprising condensable vapors, aerosol droplets, and non-condensable gases;
   (d) introducing said intermediate mixture to a multi-stage separator comprising at least one heated electrochemical separator followed by at least one heat exchanger, wherein said at least one electrochemical separator and said at least one heat exchanger are operated under effective conditions to collect individual liquid bio-oil fractions, including a final liquid bio-oil fraction, each derived from said condensable vapors and said aerosol droplets, wherein said at least one heat exchanger and said at least one electrochemical separator are operated with a heat exchanger wall temperature and an electrochemical separator wall temperature maintained above the water saturation temperature at the water vapor pressure determined within said at least one heat exchanger and said at least one electrochemical separator, respectively, such that water content is maximized in said final liquid bio-oil fraction;
(e) recovering and recycling at least some of said non-condensable gas from said intermediate mixture back into said reactor; and
(f) recovering at least some of said solid biochar as a cooled, stable biochar product.

2. The method of claim 1, said method further comprising reducing the particle size of said biomass, drying said biomass, or both of these steps.

3. The method of claim 1, wherein said biomass comprises about 10 wt % moisture or less and contains an average effective particle size of about 6 mm or less.

4. The method of claim 1, wherein said biomass is pre-treated biomass selected from the group consisting of torrefied biomass, acid-treated biomass, enzyme-treated biomass, steam-treated biomass, washed biomass, density-modified biomass, viscosity-modified biomass, and any combinations thereof.

5. The method of claim 1, wherein said reactor is a fluidized-bed reactor whose fluidizing gas includes at least some of said non-condensable gas recycled from step (e).

6. The method of claim 1, wherein said reactor is an auger-type reactor comprising at least one auger for conveying said reaction mixture and said heat carrier.

7. The method of claim 6, wherein said intermediate mixture is substantially separated from at least some of said biochar and said heat carrier within said auger-type reactor; said method further comprising separating said biochar from said heat carrier, recycling said heat carrier to step (b), and feeding said biochar to step (f).

8. The method of claim 1, wherein said multi-stage separator comprises two or more electrochemical separators and/or two or more heat exchangers in parallel.

9. The method of claim 1, wherein at least one of said bio-oil fractions is further treated by one or more techniques selected from the group consisting of heating, aging, blending, reacting, upgrading, refining, hydrotreating, adding an emulsifier, adding a surfactant, adding a chemical additive, and any combinations thereof.

10. A method of biomass fast pyrolysis and fractionation, said method comprising:
(a) providing a feedstock comprising biomass;
(b) introducing said biomass to a reactor, operated under fast pyrolysis conditions, and in the presence of a heat carrier and/or a heated gas, to convert said biomass to a reaction mixture comprising condensable vapors, aerosol droplets, non-condensable gases, and solid biochar;
(c) removing and recovering at least some of said solid biochar from said reaction mixture, to produce an intermediate mixture comprising condensable vapors, aerosol droplets, and non-condensable gases; and
(d) introducing said intermediate mixture to a multi-stage separator comprising at least one heat exchanger and at least one electrochemical separator, wherein said at least one heat exchanger and said at least one electrochemical separator are operated under effective conditions to collect individual liquid bio-oil fractions, including a first liquid bio-oil fraction, each derived from said condensable vapors and said aerosol droplets,
wherein said at least one heat exchanger is operated with a wall temperature maintained above the water saturation temperature at the water vapor pressure determined within said at least one heat exchanger, to minimize water content in said first liquid bio-oil fraction.

11. The method of claim 10, wherein said multi-stage separator comprises two or more heat exchangers and two or more electrochemical separators, collectively integrated to collect multiple liquid fractions from said intermediate mixture.

12. The method of claim 10, wherein said at least one heat exchanger is operated with a heat-transfer fluid maintained above 100° C.

13. The method of claim 10, wherein at least one of said heat exchangers is a multi-zone heat exchanger with multiple temperature set-points.

14. The method of claim 10, wherein said multi-stage separator comprises a first electrochemical separator prior to a first heat exchanger.

15. The method of claim 10, said method further comprising ionizing at least a portion of said aerosol droplets prior to introduction of said aerosol droplets into said electrochemical separator, to increase collection efficiency within said electrochemical separator.

16. A method of biomass fast pyrolysis and fractionation, said method comprising:
(a) providing a feedstock comprising biomass;
(b) introducing said biomass to a reactor, operated under fast pyrolysis conditions, and in the presence of a heat carrier or a heated gas, to convert said biomass to a reaction mixture comprising condensable vapors, aerosol droplets, non-condensable gases, and solid biochar;
(c) removing at least some of said solid biochar from said reaction mixture, to produce an intermediate mixture comprising condensable vapors, aerosol droplets, and non-condensable gases;
(d) introducing said intermediate mixture to a multi-stage separator comprising at least one heat exchanger and at least one electrochemical separator, wherein said at least one heat exchanger and said at least one electrochemical separator are operated under effective conditions to collect individual liquid bio-oil fractions each derived from said condensable vapors and said aerosol droplets;
(e) recovering and recycling at least some of said non-condensable gas from said intermediate mixture back into said reactor; and
(f) recovering at least some of said solid biochar as a cooled, stable biochar product, wherein heat contained in said solid biochar is integrated with any one or more of steps (a)-(e).

17. The method of claim 16, wherein step (f) comprises utilizing a portion of said non-condensable gas to enhance biochar cooling and recovery.

18. The method of claim 16, wherein step (f) comprises introducing said biochar to a fluidized bed that is fluidized with said non-condensable gas.

19. The method of claim 16, wherein step (f) comprises introducing an inert gas to elutriate said biochar out of a mixture with said heat carrier.

20. The method of claim 16, said method further comprising producing agglomerated biochar including one or more added binders selected from the consisting of lignosulfonates, vegetable oil, water, whole bio-oil, bio-oil fractions, biomass, clay, bitumen, coal, and any combinations thereof.

* * * * *